Patented Nov. 28, 1939

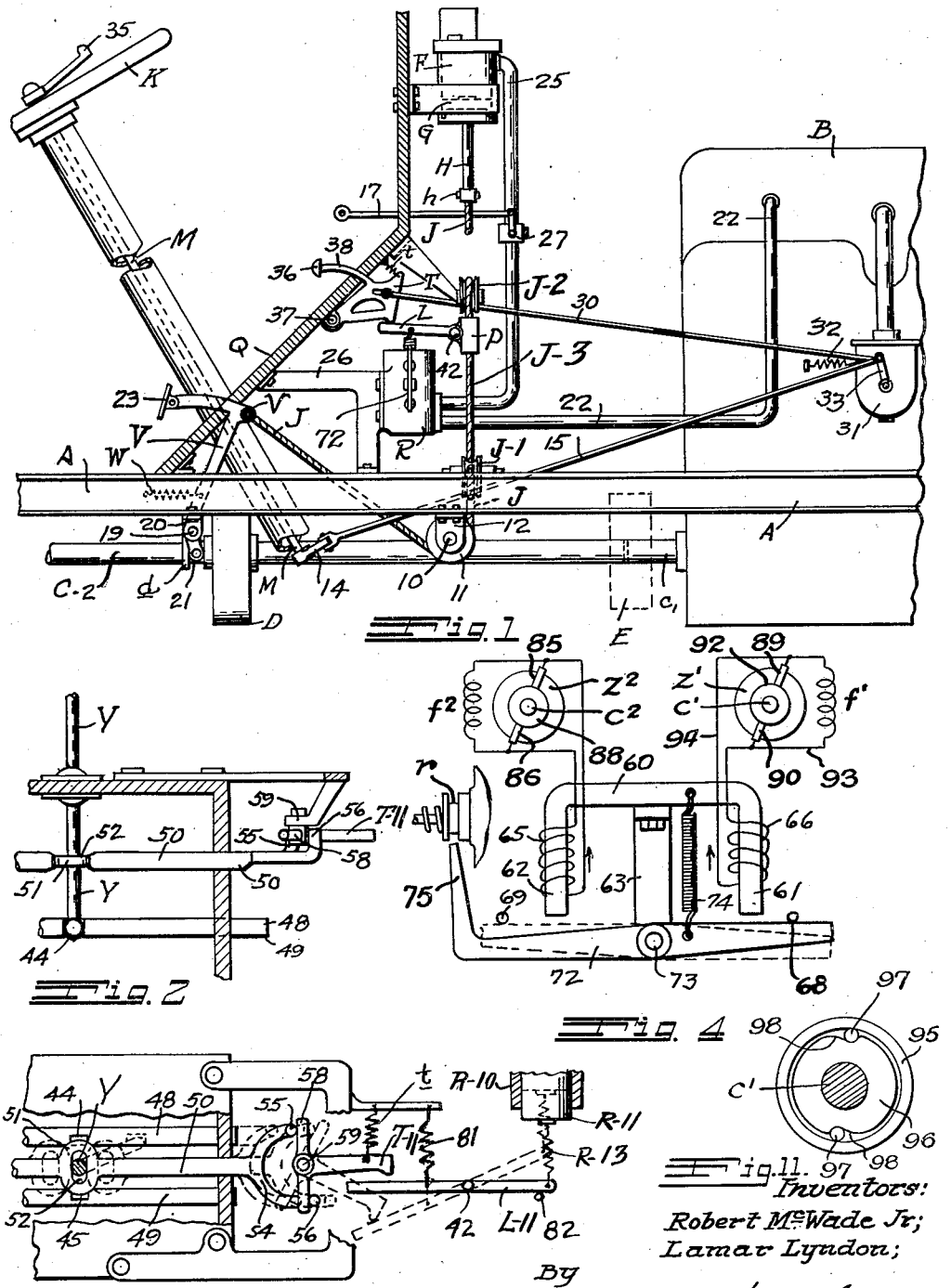

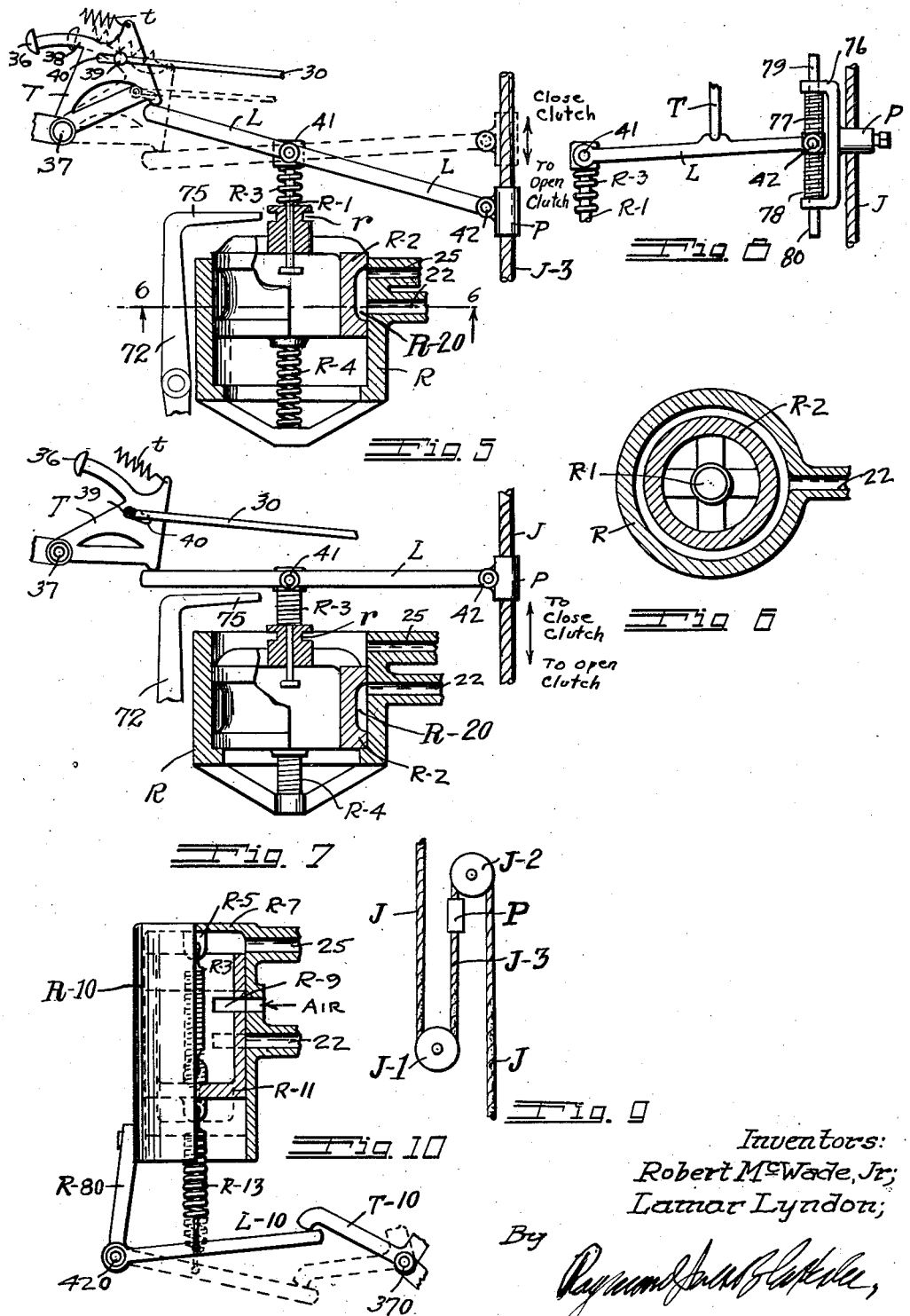

2,181,733

UNITED STATES PATENT OFFICE 2,181,733

MOTOR VEHICLE CONTROL MEANS

Robert McWade, Jr., and Lamar Lyndon, Los Angeles, Calif., assignors, by direct and mesne assignments, to Bendix Products Corporation, South Bend, Ind., a corporation of Delaware Application June 7, 1932, Serial No. 615,802

16 Claims. (Cl. 192—.01)

This invention relates to control for motor vehicles and the like, driven by a prime mover and having a clutch interposed between the prime mover and the load, or other similar power system.

Some of the objects of this invention are: To actuate the clutch by a power device without operation by, or attention of, the driver; to control the said power device by a special control means which operates to cause the power device and the thereby operated clutch to simulate manual movement; to operate the power control means by one of the manual controls for other devices of a motor-car such as the engine accelerator or the gear shift mechanism, and to so arrange the connection between the manual member and the power device control as to cause the operating member of said control to move in accordance with the movement of the manual member, so that the power device will move the clutch in the same manner as if it were moved directly by the manual member; to provide a control of such characteristics that initial movement of its parts will not cause complete movement of the power device, but if movement of its actuating member is stopped, movement of the power device will also stop, continuous movement of the power device requiring continuous movement of the control means, and complete movement of the power device requiring movement of the control also throughout its range of motion.

Another object is to provide means for preventing effective connection between the engine and the power shaft when the power shaft speed greatly exceeds that of the engine shaft; also to provide a means for rendering all the said automatic and interrelated parts inoperative to permit "coasting" with the engine and power shaft clutched together. Other objects of this invention will appear as this description proceeds.

In general, the invention includes a provision of a means of interconnecting the engine accelerator or control or the gear-shift lever or, at times, both, with a clutch-moving mechanism or servo-motor of any type, such as a piston, to move the clutch when the manual control lever is moved and, in this manner, to provide for automatic closing or releasing of the clutch as the piston, or the manually moved lever, may dictate, and without the necessity of directly moving the clutch or applying any manual force thereto to open it.

The motive device may be of any convenient form, but the simplest is the application of diminished air pressure in the manifold of the usual internal combustion engine, which provides an ample power source for operating the parts and requires no addition of special mechanism other than an open-ended cylinder and a piston adapted to move therein with some special form of control valve therefor. One feature of the invention is the special control means for the power device which, in the case of an air-moved piston, takes the form of a so-called "retreating" valve, or, if other power means were adopted a control means therefor producing similar response, would be used. The control valve differs from any present type of valve known to applicants in that it does not cause or permit complete movement of the motive device, from one limit to the opposite limit by a single or initial valve movement, but the valve movement must proceed continuously in order that the power, or motive, device may likewise move continuously, the control valve being adapted to stop flow of pressure to the power device whenever movement of valve control means also ceases; that is, the movement of the power device follows the movement of the actuating means of the control valve, in that the motive device will continue to move only so long as the valve actuating means is moved.

Obviously, in this system, the motor or piston, operating the clutch and other parts connected thereto, may either be given a slight movement or caused to travel over any portion of the total movement of which it is capable.

Other features include means to prevent clutch engagement or complete mechanical connection between engine and the drive or power shift when the two have widely differing angular velocities, the connection becoming possible, or effective, only when the speed of the two shafts becomes nearly equal. When the difference in speed between the power shaft and the engine is comparatively great, engagement of the clutch will cause a shock which may be injurious to the mechanism or uncomfortable to the occupants of a vehicle, and in order to avoid this condition, certain appliances, some alternative, are introduced to prevent complete driving engagement between engine and power shaft when their speeds differ too greatly.

Applicants are aware of existing arrangements for causing automatic movement of the clutch when one of the manual controls of the vehicle is moved, but none is known to them possessing all of the features of this present invention and all whereof are deemed essential for smooth, simple, easy and comfortable control of a power shaft of a vehicle at all times and under any conditions, whether operated by inexperienced drivers or skilled chauffeurs.

While the succeeding drawings and description are illustrative of one form of this invention, being confined to air-pressure-moved parts, it is obvious to any person skilled in the art that other motive forces and differing means can be used for accomplishing these same results.

With the foregoing and other objects in view, the invention consists in the novel and useful formation, construction, interrelation and combination of parts, members and features, as well as mode and methods of use thereof, and steps and performances followed and obtained, all as hereinafter described, shown in the drawings and finally pointed out in claims.

Referring to the drawings:

Fig. 1 is a fragmentary side elevation, partly in section, and showing the general assembly of the parts;

Fig. 2 is an elevation, partly in section, of valve-moving parts operated by the gear shift lever;

Fig. 3 is a plan of parts shown in Fig. 2 showing three different positions of the gear shift and the thereto connected member, neutral position shown in full lines;

Fig. 4 is a diagrammatic elevation of an electromagnetic speed control for control valves with electrical means for operating same.

Fig. 5 is a mid-sectional longitudinal view of one form of control valve and its control means in one position;

Fig. 6 is a sectional plan of the same valve on line 6—6 of Fig. 5;

Fig. 7 is a longitudinal section of the same valve and control means in a second position;

Fig. 8 is an elevation showing a double spring mounting on the power cable for the valve control lever;

Fig. 9 is a diagrammatic view of the clutch actuating cable of Fig. 1;

Fig. 10 is a longitudinal elevation, partly in section, of another form of control valve;

Fig. 11 is a transverse sectional view of an overrunning clutch.

In Fig. 1, the general arrangement of the operating parts arranged to be controlled by the accelerator operating the carburetor 31 of the internal combustion engine B is shown. Piston G operating in cylinder F is connected by piston rod H and connector h to cable J, which cable passes to a lever V, which latter controls the opening and closing of clutch D. This lever is pivoted at 19 on bracket 20 attached to part of the chassis framework A, as shown. The lower end of the lever has rollers 21 operating in a channeled collar d so that movement of this lever V will move collar d longitudinally of shaft C—2, thereby opening or closing clutch D, as is well known in the art. A foot plate 23 may be attached to a projection from lever V so that the clutch can be operated by foot pressure independently if desired. A spring W is mounted to draw lever V toward the left. Cable J passes around pulley 11 pivoted about pin 10 supported on bracket 12, attached to part of the chassis A, and it is obvious that upward movement of piston G will draw lever V in a direction counter to pull of spring W, thereby opening clutch D. As shown in Fig. 9, cable J passes over two idler pulleys J—1 and J—2, suitably mounted on the vehicle frame, the intermediate portion J—3 of the cable being connected with valve operating lever L by member P, for a purpose which will appear more fully hereinafter. The cylinder F is open at its lower end, closed at its upper end, and pipe 25 enters the upper end of the cylinder. This pipe 25 is connected to valve R which is mounted on bracket 26, which in turn is supported on the footboard Q and frame A. Valve R is also connected by pipe 22 to the manifold of internal combustion engine B as shown. This valve, as described more fully in detail later herein, is arranged to connect the cylinder F with the manifold and also to cut off the connection between the cylinder and the manifold and admit air to the cylinder. Obviously, connection with the manifold to the cylinder will cause reduction of pressure inside the upper end of the cylinder, so that the higher atmospheric pressure acting on piston G will move it upward, thereby opening clutch D as before explained. When connection from the manifold to the cylinder is closed and air pressure admitted to the cylinder, piston G is pressure balanced and the springs in the usual clutch, as well as the retracting spring W, draw lever V to the left and draw piston G downward, thereby closing the clutch.

It is one of the objects of this valve control to so connect the manifold source of low pressure with the cylinder and the atmospheric pressure that the piston G will move in cylinder F in a manner which will follow identically the manner in which the control valve operating stem is moved; that is, if the valve stem be moved a short distance, the pressure difference produced on the two sides of piston G will return to balance after a short movement of the piston, causing movement to cease. The valve is so designed that no matter how operated the piston G cannot be jerked inward or outward, giving a corresponding quick gripping of the clutch parts and thereby imposing shocks on the engine and the mechanism of the vehicle. Several forms of valves have been devised to fulfill these conditions, which will be later described.

If the clutch is engaged at a time when shaft C—2, connected with the drive wheels of the vehicle, is running at a very high speed and shaft C—1 from the engine is at a low speed, or vice versa, closing of the clutch, followed by almost instantaneous acceleration of one set of parts or the other will cause shock and possible injury to the mechanism. As explained, quick closing of the clutch is objectionable when the two shafts are running at widely different speeds. Hence, a means is provided to prevent such closure or connection of the two shaft sections, when wide speed differences exist between shaft C—1 and shaft C—2. One such means is indicated at E, shown in dotted lines, which may take any one of several forms, one preferred form being that of the well-known over-running clutch as illustrated in Fig. 11. This device, well known in the art, comprises a circular disc or member 96 attached to the engine shaft C—1, having a plurality of peripheral cuts 98 to accommodate rollers or balls 97, these cuts having bottoms which slope outward in one direction. A second circular member 95, coaxial with disc 96, is attached to a second shaft not shown. This member 95 has an annular lip projecting from one face which encircles disc 96. Obviously for clockwise rotation of shaft C—1 member 96 can drive member 95 by the wedging of the rollers 97 between annulus 95 and the sloping bottoms of cuts 98, while annulus 95 cannot drive member 96 because relative rotation between members 95 and 96, in which 96 moves the faster, causes the rollers 96 to move to the deepest portions of the cuts 95, thereby eliminating any connection between the two members, all as is well known in the art.

This arrangement prevents driving connection between the shafts when the speed of the power shaft exceeds that of the engine shaft. A preferred device is one which prevents connection between the two shafts when a wide speed difference exists between them. Such an arrangement is later described herein.

The valve shown in Figs. 5, 6 and 7 is one of the types of control valve which is meant to change the pressures in cylinder F in such manner that movement of piston G will follow the manual movement of the operating stem R—1 of the control valve R shown.

As shown, valve piston R—2 working in open-ended cylinder R, is moved downward by pressure on spring R—3, guided by stem R—1. This downward motion is resisted by spring R—4. Pipe connections 22 and 25 connect with manifold and cylinder F respectively. Pressure is applied to spring R—3 by lever L having one end pivoted at 42 on member P mounted on clutch cable section J—3. Guide stem R—1 is pivoted at 41 to lever L intermediate its ends. The free end of the lever is depressed by bell-crank member T pivoted at 37, and having an extension 38 on the end whereof is mounted pedal 36. Throttle valve control rod 30 is also moved by pedal 36 and the rotation of the member T, there being a pin 39 at the end of rod 30, and a slot 40 adapted to receive pin 39, so that member T may move through an appreciable distance before pin 39 strikes the left-hand end of slot 40 and is thereby moved to open the throttle valve. *t* is a retracting spring for member T. Obviously, pushing against pedal 36 will open the throttle and depress valve piston R—2 and compress springs R—3 and R—4, while release of pedal 36 produces converse operations.

In the upper position of parts as shown in Fig. 5 the valve piston R—2 provides a passage R—20 through the valve between pipes 22 and 25, so that the engine manifold is connected with power cylinder F. Power piston G is thereby drawn inward, compressing the clutch springs and extending spring W, and the clutch is opened.

Depression of member T will move valve piston R—2 downward to position shown in Fig. 7. This closes pipe 22 and admits atmospheric pressure to pipe 25 and to power cylinder F. The clutch springs and spring W then draw the piston G outward, closing the clutch.

By adjustment of lost motion slot 40, the closing of the clutch can be timed for any desired engine speed or throttle opening. When lever L and valve piston R—2 are depressed and the pressures on piston G balance, the movement of the piston moves cable section J—3 in a direction opposite to that of the initial movement of the free end of lever L, that is, upward, for the figures shown, which motion tends to restore valve piston R—2 to its upper position. Conversely, when valve piston R—2 is released from its lower position and moves upward to connect the engine manifold with cylinder F, the resulting motion of the parts to open the clutch will move cable section J—3 and the pivoted end of lever L downward, tending to return valve piston R—2 to its initial position. When valve piston R—2 is depressed the clutch moving parts will be moved to close the clutch by the clutch springs and spring W. Obviously, if member T be slightly raised, only a slight movement of power piston G will occur, and for continuous movement of power piston G, member T must be continuously moved. When member T stops, piston G also stops, within limits of valve movement.

The control valve described is a "retreating" type in which the actuation of the valve causes forces to act which tend to neutralize the initial actuation.

Another form of "retreating" valve is shown in Fig. 10. This type is independent of the movement of piston G and cable J but is caused to retreat by pressure changes in the valve itself. Pipe 25 connects with cylinder F. One end of the valve body R—10 is closed by head R—7. Piston R—11 working in the body R—10 is a sleeve closed at one end and has a peripheral slot R—9 as shown. In addition to the two pipe connections 22 and 25, an air opening is also made in the body R—10 intermediate its ends. Piston R—11 is held in place by spring R—12 suspended from lug R—5 on the under side of head R—7, and by spring R—13 attached to the centre of the piston R—11 and lever L—10. This lever is pivoted at 420 on bracket R—80, spring R—13 being attached to lever L—10 intermediate its ends. The free end of the lever L—10 is adapted to be engaged by an arm of member T—10. In the position shown in the full lines, a direct connection is provided from the air vent through mating valve slot R—9, up through sleeve piston R—11 to pipe 25, and thence to power cylinder F and the pressures on both areas of valve piston R—11 are the same. By turning member T—10 about pivot 370 and thereby depressing lever L—10, the parts are moved downward to the positions indicated in the dotted lines. In this position the air vent is closed by the sleeve piston R—11, and peripheral valve slot R—9 registers with the opening connected to pipe 22, thereby admitting the low pressure from manifold B to the interior of the valve R—10 and also providing a path through pipe 25 to power cylinder F. This produces two effects. The lower pressure in cylinder F causes piston G to begin moving; also the reduced pressure inside the valve sleeve piston R—11 causes a pressure tending to move the piston back up to the position shown by the full lines, so that the valve "retreats" as before described, but due to pressure change in the valve.

In either form of valve shown, actuation of the control valve causes changes tending to restore the valve to the position from which it was moved. This is true of either position of the valve. If, in the form shown in Figs. 5, 6 and 7 the valve piston R—2 is in a depressed position and lever L is then raised to move piston R—2 upward and make a connection between manifold and power cylinder and admit low pressure air to the latter, power piston G will move inward, so that cable section J—3 will move in a direction opposite to that of the lever, thereby tending to return valve piston R—2 to its lower or original position. Similarly, if the valve shown in Fig. 10 has its piston in the lower position as indicated in the dotted lines, the pressure inside the valve being that of the manifold, and lever L—10 is raised to permit air to enter the valve body and therethrough to power cylinder F, the increased pressure will diminish the total of the forces which move the valve piston upward so that this member will tend to return to its initial lower position.

Hence, the control means for the power piston will tend to retreat, automatically, from any position to which the parts may be relatively moved to the initial position from which movement began, and the power piston will follow and simulate the movement of the valve control piston.

At times it is desired to coast down hill with the engine clutched to the power shaft, to act as a brake. This is not possible, unless the interrelated operable parts, before described, are rendered inoperable. Hence, the provision of the shut-off valve 27 in pipe 25 leading to cylinder F, which valve is operated by hand-link 17 connected with the valve. By closing valve 27, all of the automatic, clutch-moving appliances described become inoperative, and the vehicle can coast down hill with the throttle closed and the engine clutched to the power-shaft, and, in this way, made to serve as a brake, as is well-known to drivers of motor cars.

In Fig. 1, K is the steering wheel, 35 the hand-lever for throttle control, which is connected with crank 14 by shaft M in the steering column, and rod 15 extends from crank 14 to throttle lever 33 on carburetor 31, which latter is also connected to rod 30 connected with foot control T. Spring 32 pulls continuously to close the throttle.

While the figures showing the complete assembly and the description thereof have shown the control of the clutch to follow movement of the engine throttle, it is obvious that this control may be transferred to the gear shift lever instead, and under many conditions this becomes the more desirable arrangement. Figs. 2 and 3 show the manner of this control. The gear shift lever Y, working in notches 44 and 45, in the two gear moving rods, 48 and 49, operates as usual except that a link member 50 is added having a widened portion 51 in which is an elongated slot 52 to accommodate lever Y. The lever Y may be moved back and forth and also transversely as desired, there being ample space in the opening 51 for the usual transverse movement. Lever Y terminates at one end in a spread or U-shaped portion 54, whereof one leg 55 is shorter than the other leg 56. Transverse bar 58, attached to member T—11 and pivoted at 59, is adapted to turn in clockwise direction only when link 50 is moved in either direction, right or left. The two legs 55 and 56 of U bend 54 are turned upward to form projections to cooperate with bar 58, the projection from 55 contacting with the left-hand edge of bar 58 and projection 56 contacting with the right-hand edge of the bar. Obviously, with the pivotal point 59 lying between the two projections, longitudinal motion of link 50 in either direction will turn bar 58 and member T—11 in only one direction, viz., clockwise. Hence, if the control valve moving means is pressed against by the end of member T—11, the valve will be opened whenever clutch lever Y is moved in either direction from neutral. By applying a counter spring 81 to lever L as indicated in Fig. 3, the valve is always drawn to that position which connects the engine manifold with the power cylinder, if lever L—11 is free to move. If the end of lever L—11 is depressed by member T—11, overcoming spring 81, the valve springs will retract the valve piston to cut off the manifold pressure and admit atmospheric pressure to power cylinder F, thereby permitting clutch D to close. Hence, the clutch is held open while gear-shift lever Y is in neutral, and the clutch closes only after the lever is moved to its extreme position to the right or left. t is a counter spring for member T.

In order to maintain the neutral or clutch-opening position of the control valve unchanged until the lever Y has moved far enough from neutral to mesh the gears, various devices may be employed. The simplest means is to provide lost motion between some pair of cooperating parts as between lever Y and the hole 52 through link 50 or between the two contact projections 55, 56 and transverse member 58. Mounting the lever L—11 with its end at some distance laterally from the end of member T—11 as shown in Fig. 3 provides a preferred lost motion arrangement in which either gear shift slide 48 or 49 and link 50 may be moved a considerable distance from neutral before the right-hand end of member T—11 turns far enough to contact with lever L—11, within which initial range of movement the clutch is held open and the gears may be meshed. Further movement of lever Y will move member T—11 to depress lever L—11, thereby causing the control valve piston R—11 to move to the position indicated in Fig. 10, which permits the clutch D to close.

In the operation of the system, when the gear shift lever Y is in neutral position and valve stem R—3 depressed, the clutch is drawn open by power piston G. The first movement of the lever from neutral, either forward or backward, is to shift the gears while the clutch is held open. Then a slight additional movement causes motion of lever L to move the valve, whereby the clutch is closed, as explained.

Obviously, the converse operation will likewise be automatically performed. When the gears are in mesh and the control valve in position which connects the power cylinder with atmospheric pressure, thereby closing the clutch, and it is desired to shift the gears, the first movement of the gear shift lever Y back toward neutral moves member T—11 away from lever L—11. Spring 81 draws lever L—11 back to neutral position causing opening of the clutch, as explained. With the clutch open, or disconnected, any desired shifting of gears may be affected, followed by re-closing of the clutch, as explained. Hence, the initial movement from mesh position of the gear-shift lever Y is to so move lever L—11 as to operate valve R—10 to open the clutch, and the final movement from neutral is to close the clutch. Hence, to shift gears, the ordinary manipulation of the gear shift lever alone opens the clutch first, then moves the gears into mesh, then closes the clutch, so that no independent manipulation of the clutch is necessary and no attention need be given it, the movement of the gear shift lever automatically governing the clutch as required. The clutch is always open when gear shift is in neutral; closed when the gear shift is at either extreme. While a gear-shift, as well-known in the art, has been discussed as a control means for changing the torque delivered to the drive wheels of a motor car, other means for changing the torque to the drive shaft may be employed. In any case a control member for changing the torque is required, and the before-described connection between the control member and the control valve would be equally applicable.

In Fig. 8 is shown a double spring mounting for an end of a valve-operating lever L on clutch-moving cable J. Yoke 76 attached to cable clamp P has a hole through each bent end to accommodate coaxial guide rods 79, 80, between which latter is attached the bearing 42 whereon an end of lever L is pivoted. Springs 77 and 78 are each interposed between an end of yoke 76 and the shoulder formed by bearing 42, the springs encircling the guide rods 79, 80, as indicated. By use of this mounting, the change in the lengths of springs 77, 78, when cable J moves, reduces the amount of movement of bearing 42 for a given distance of motion of cable J. Since the before described valves admit energy to the operating cylinder or equivalent member, and cut off energy therefrom, they constitute energy-controlling or energy-directing means.

As before indicated, means for preventing actuation of the clutch D when the difference between the speed of the engine shaft and that of the power shaft is too great, is necessary if smooth and safe connection between them is obtained. One suitable means for controlling this condition is shown diagrammatically in Fig. 4. 60 is an electro-magnet having branches 61 and 62, supported on middle member 63, as shown. The leg 61 is wound with a coil 66 which receives current via wires 93, 94, from an electro-dynamic device Z—1 driven by the engine shaft C—1. On opposite leg 62 is the winding 65, which is energized from an electro-dynamic device as Z—2, driven at the speed of the drive shaft C—2. In the figures, Z—1, Z—2 represent rotors driven by shafts C—1, C—2 respectively. *f*—1 and *f*—2 are field windings, 85 and 86 are brushes or equivalent for armature Z—2 contacting with commutator 88. For rotor Z—1, 92 is the commutator on which brushes 89 and 90 rest. Of course, this is only one form of an opposed voltage mechanism, other forms of dynamo-electric machines can be substituted, which need not use commutators at all as is well understood in the electro-dynamic art. The voltages for each of the two windings 65 and 66 are respectively proportional to the speeds of the machines driven by the two shafts C—1 and C—2. The pull of an unsaturated electro-magnet varies with the square of the voltage across its winding. Artificial air gaps are made by stops, as 68 and 69, as shown. Armature 72, pivoted at 73, intermediate the two magnet limbs, is retracted by spring 74 in one direction. The left end of armature 73 has a projecting member 75 which cooperates with channel *r* in a member of valve R. Obviously, the member is free to move when the armature is in position shown, but if it be moved to the position shown by the dotted lines, overcoming the pull of spring 74, the valve member R—9 will be locked by engagement of projection 75 in channel *r*.

If the pulls produced by the two windings are equal, the spring 74 will draw the armature to its unlocking position, as shown. If the speed of the device Z—2 driven by the power shaft C—2 should rise, so that its voltage is much greater than that of the device Z—1 driven by the engine shaft C—1, the pull of the magnetic winding 65 will exceed that produced by the coil 66 on magnet limb 61, it being understood that the intermediate supporting member 63 forms a part of either magnetic circuit. Hence, a much higher speed of the drive shaft than of the engine shaft will cause the pull produced by coil 65 on magnet limb 62 to exceed that of spring 74, and the armature will be moved to engage the valve member and prevent movement of the valve. If both electro-dynamic devices are operating at nearly similar speeds, whether they be high or low, the magnetic pull produced by either of the coils will be nearly the same, the spring pull always predominating and leaving the valve stem free to be moved at any time. But from the preceding description it is obvious that if the speed of the power shaft greatly exceed that of the engine, the valve stem will be locked by this device.

Having described our invention in connection with illustrative embodiments, forms, proportions and arrangement of parts, it will be understood that many variants thereof are possible to those skilled in the art, and our invention, in its broader aspects, is not limited to the specific construction herein described and shown, as changes in the sizes, proportions, configurations, arrangements, assemblage, interaction, juxtaposition and mechanical relations, as well as additions, omissions, substitutions, combinations and alterations of forms, parts, members and features may be made without departing from the broad spirit of this invention.

Having thus disclosed our invention, we claim and desire to secure by Letters Patent:

1. A power system having a motor; a driven shaft; a clutch between the motor and the driven shaft; motor speed control means; power means for actuating the clutch; a control device for said power means; manual means for actuating said control device and said motor speed control means, said control device having parts and members operable to automatically change the energization of said power means during the movement of said manual control means over a part of its total range of motion; and means responsive to the speed of the driven shaft in excess of the speed of the motor for automatically locking said control device against movement.

2. A power system having a motor; a driven shaft; a clutch between the motor and the driven shaft; motor speed control means; power means for actuating the clutch; a control device for said power means; manual means for actuating said control device and said motor speed control means, said device having parts and members operable to automatically change the energization of said power means during the movement of said manual means over a part of its total range of motion; and means responsive to a predetermined speed of the driven shaft in excess of the speed of the motor for locking said control device against motion.

3. In combination, a pressure power device and control means therefor, including a cylinder, a piston working therein, two sources of fluid pressure whereof one exceeds the other, the greater being in constant communication with one side of the piston; a control valve for said cylinder, including a body, a working member therein, a plurality of outlets, one whereof communicates with said cylinder and one with each of said pressure sources; means for operating said working member whereby the differing pressures may alternately be admitted to the side of the piston opposite that under the greater pressure, and auxiliary parts adapted to move the said valve working member back toward the position from which it is displaced when movement is imparted thereto by said operating means.

4. A pressure power control means, including a cylinder, a piston working therein, two sources of fluid pressure whereof one exceeds the other, the greater being in constant communication with one side of the piston; a control valve for said cylinder, having a plurality of outlets, one whereof communicates with each cylinder and one with each of said pressure sources; a piston in said valve, movement whereof alternately admits the differing pressures to the side of the piston opposite that under the greater pressure, means for moving said valve piston, and additional means adapted to automatically return the valve piston back toward the position from which it is displaced after movement thereof by said moving means, said valve structure thus providing for successive movements and retreats until final complete travel of the valve piston is reached, at which position communication between the pressure-variable end of the cylinder and one of said pressures is established.

5. In a power transmission system having a power source, a driven shaft, and a clutch between said elements, the combination of a power device to actuate the clutch, an energy source therefor, connections between said energy source and the power device, energy-directing means interposed between the power source and the power device, a manual control for a member of said system, connections between said manual control and the energy-directing means, operable to cause movement of the energy-directing means in accordance with the movement of said manual control, said energy-directing means having parts and members operable to automatically move in a direction opposite to that of motion imparted by said manual control, and automatic means responsive to the speed of the driven shaft in excess of the speed of the source of power for locking said energy-directing means against motion.

6. In a power transmission system having a power source, a drive shaft, and a clutch between said elements, the combination of a power device to actuate the clutch, an energy source therefor, connections between said energy source and the power device, energy-directing means interposed between the power source and the power device, a manual control for a member of the said system, connections between said manual control and the energy-directing means adapted to cause movement of the energy-directing means in accordance with the movement of said manual control and the thereto connected member, said energy-directing means having parts and members adapted to automatically return toward a position from which they are moved by said manual control, said power clutch-moving parts being adapted to open the clutch prior to, and close it subsequent to, a change in said manually controlled element of the system, means for locking the energy-directing means against movement when the speed of the drive shaft exceeds that of the power source by a predetermined value, and means for rendering said power device and energy-directing means inoperative.

7. In a power transmission system for motor vehicles, an internal combustion engine, a drive shaft, an engine throttle and a control lever therefor; a clutch; a power device comprising a cylinder and a piston working therein moving the clutch; a conduit from the engine manifold to the said cylinder; a control valve interposed in the conduit; connecting means between said lever and an actuating member of said valve, internal parts and members in said valve adapted to move responsive to pressure changes in the valve, and oppositely to the motion imparted by the said lever to the valve actuating member.

8. In a power transmission system for motor vehicles, an internal combustion engine, a drive shaft, an engine throttle and a control lever therefor; a clutch; a power device comprising a cylinder and a piston working therein for moving the clutch, a conduit from the engine manifold to the said cylinder; a control valve interposed in the conduit, an actuating member therefor; connecting means between said lever and the valve actuating member, and parts and members of said valve adapted to move responsive to changes produced by movement of the valve, and oppositely to the motion imparted thereto by the said lever, the distance of motion of said lever and of the valve actuating member being substantially constant.

9. In a power transmission system for motor vehicles, an internal combustion engine, a drive shaft, an engine throttle, and a control lever therefor; a clutch; a power device comprising a cylinder and a piston working therein for moving the clutch, a conduit from the engine manifold to the said cylinder; a control valve interposed in the conduit; an actuating member therefor, connecting means between said lever and said actuating member; and parts and members in said valve adapted to move responsive to pressure changes in the valve, and oppositely to the motion imparted by the said lever to the valve-actuating member, the distance of motion of said lever and of the valve-actuating member being substantially constant, the lever movement being the greater.

10. In a power transmission system for motor vehicles, an internal combustion engine, a drive shaft, an engine throttle and a manual control lever therefor; a clutch; a power device comprising a cylinder and a piston working therein for moving the clutch, a conduit from the engine manifold to the said cylinder; a control valve interposed in the conduit; an actuating member therefor; means operated by said lever to move said actuating member, a connection between said actuating member and said power device whereby a member in said valve is adapted to be moved responsive to movement of said piston and oppositely to the motion imparted to the valve by the said lever, whereby movement of the valve by said control lever is followed by automatic return of the valve parts towards their initial positions.

11. In a power transmission system for motor vehicles, an internal combustion engine, a drive shaft, an engine throttle, and a manual control lever therefor; a clutch, a power device comprising a cylinder and a piston working therein for operating the clutch, a conduit from the engine manifold to the said cylinder; a control valve interposed in the conduit; an actuating member therefor, connecting means between said lever and said actuating member, parts and members of said valve adapted to move responsive to pressure changes in the valve, and oppositely to the motion imparted by the said lever to the valve-actuating member, a manually operable valve in said conduit whereby the clutch-actuating cylinder may be cut off from the manifold and a one-way drive member located between the engine and power shaft adapted to communicate torque in one direction of rotation only.

12. In a power transmission system for motor vehicles, an internal combustion engine, an engine accelerator, a clutch, a fluid pressure motor for operating said clutch, a conduit connecting the engine manifold and clutch motor, and follow-up valve means interposed in said conduit for controlling the energization of said motor, said valve means including a valve member operatively connected with said accelerator and with the clutch.

13. In a power transmission system for motor vehicles, an internal combustion engine, an engine accelerator, a clutch, a fluid pressure motor for operating said clutch, a source of fluid pressure, a conduit connecting said motor and source, valve means interposed in said conduit for controlling the fluid pressure energization of said motor including a pressure-responsive member subjected to the pressure of the fluid in said motor, and means including a graduating spring connecting said member and accelerator.

14. In combination with a motor vehicle having a clutch, a throttle operating member, a fluid motor operatively connected with the clutch for controlling the engaging and disengaging movements thereof, and follow-up valve means for controlling the energization of said motor, said valve means including a movable valve member connected to said throttle operating member and to said clutch.

15. In combination with a motor vehicle having a clutch, a throttle operating member, a fluid motor operatively connected with the clutch for controlling the engaging and disengaging movements thereof, follow-up valve means for controlling the energization of said motor, said valve means including a movable valve member, and a lever connecting said valve member with said throttle operating member and clutch.

16. In combination with a motor vehicle having a clutch, a throttle operating member, a fluid motor operatively connected with the clutch for controlling the engaging and disengaging movements thereof, follow-up valve means for controlling the energization of said motor, said valve means including a movable valve member, a lever respectively connected at its opposite ends with said throttle operating member and clutch, and means for connecting said valve member to said lever between the ends of the latter.

ROBERT McWADE, Jr.
LAMAR LYNDON.